Patented Apr. 4, 1939

2,152,974

UNITED STATES PATENT OFFICE 2,152,974

AERODYNAMIC FLAP FOR SLOTTED WINGS FOR AIRCRAFT

Henri Riviere, Paris, France, assignor to Compagnie des Avions Hanriot, Paris, France, a corporation of France Application January 30, 1937, Serial No. 123,263
In France February 24, 1936

2 Claims. (Cl. 244—42)

My invention has for its object a device for compound aerodynamic flaps enabling the lift and aerodynamic braking of an aircraft wing to be improved.

This device consists in a particular disposition of two flaps, an upper one and a lower one, enabling not only the advantages of flaps of the aileron type (lateral control) or of the flap type (wing cambered, equally on both sides), and those of flaps of the split flap type (lower surface flap) to be combined at the same time, but also to give special aerodynamic properties to the assembly of the two flaps.

It is known to provide at the trailing edge of an aircraft wing, flaps known as ailerons or flaps which enable the profile of the wing to be modified and its lift to be consequently increased or reduced. The ailerons assure the manoeuvring of the aircraft, the flaps facilitate taking off and rising.

Further it has already been proposed to locate at the rear of the wing and under the lower surface movable flaps called "split flaps" which enable the speed to be reduced, the drag of the aircraft to be accentuated and thus to obtain when landing a steep gliding angle. These flaps are the more efficient when they extend over a larger portion of the span.

In order to combine at the same time the advantages of an aileron and of a split flap and to obtain at the same time improved properties of the wing, the combined flap, according to my invention, is formed by an upper flap hinged to the wing and having a beak (sharp edge) towards the front, and by a lower flap hinged to the upper flap, the angle between the two flaps being kept constant or nearly constant during the movement of the upper flap by mechanism such as described in the Girard application Serial No. 123,288, filed January 30, 1937. The hinges are either separate or mixed on the same axis.

Although the control of each flap is separate, when the upper flap is operated, the lower flap retains relatively to the latter a nearly constant inclination, which does not depend on the position of the upper flap. This arrangement thus enables the benefits of the advantages of opening the lower flap (split flap) to be obtained without the operation of the upper flap being hindered and in all positions of the latter.

With this combined double flap I may obtain the effects of a split flap which extends over the entire span of the wing without hindering the conditions of operation of the aileron. Tests which I made in the laboratory and in flight have also shown that with the flap according to my invention the rolling moment of an aircraft was particularly increased relatively to that of ordinary aircraft. It has a value nearly double of that which can normally be expected. Further, the relative increase of the rolling moment is further accentuated for the incidences of maximum lift, for which incidences, as is well known, the lateral control devices have the greatest defects. It is therefore with large incidences, which correspond with the lowest speeds and which are generally dangerous (landing and taking off) that the advantage of my combined double flap is the greatest.

The aircraft responds more rapidly and with greater certainty to the controls, and its lateral control is improved by the presence of the lower flap on the upper flap. The equilibrium of the aircraft when taking off and landing is assured more effectively. In fact the aerodynamic qualities of the aircraft are clearly improved.

Another feature of my invention consists in the relative position of the hinging axes of the upper flap and of the lower flap. By locating the hinging axis of the lower flap in front of the hinging axis of the upper flap, I obtain the following advantages:

1. The chord of the upper flap may be reduced. Now it is desirable that this chord should be small enough so as not to require too great an effort of the pilot for its operation (banking) and for maintaining the manoeuvrability of the aircraft below a certain value which it is not desired to exceed.

2. The chord of the lower flap is increased, which is always desirable for increasing the lift of the wing (especially when landing). For this purpose the hinging axis of the lower flap is placed as far forward as possible.

3. From the relative position of the axis it necessarily follows that a portion of the mass and a portion of the surface of the aileron are located in front of the hinging axis of the latter, which ensures a static equilibrium and an aerodynamic compensation of the aileron. In any case one will make sure that this position of the axis of the aileron does not lead to the reversal of the aerodynamic reactions on the control (reversal of the forces at the control stick), and for this purpose the position of this axis should not be behind the centre of aerodynamic thrusts on the aileron.

4. The front edge of the combined flap in the form of a beak directed towards the front of the aircraft, emerges from the wing during the movement of the upper flap upwardly, which creates a yawing moment favourable to the turning of the aircraft.

5. The rolling moment of an airplane provided with the device of the present invention is appreciably increased and in particular it has a value nearly double that which would normally be expected. Furthermore, the increase in the rolling moment is accentuated for the incidences of maximum lift for which the lateral control devices have generally the greatest defects.

6. The lifting effect is obtained up to the extremities of the wing in such a manner that the distribution of the lift along the span of the wing attains an elliptical direction and not a representation roughly triangular as is produced with an increase in lift localized in the central region. Due to the elliptical distribution of the lift, the wing works in a manner nearly equal throughout and its aerodynamic properties are considerably increased.

These advantages are particular obtained when the lower flap is hinged to the most forward edge of the upper flap.

Passages for the flow of air may be provided between the wing and the upper flap. The passage of air avoids the separation of streams at the upper part of the flaps.

My invention is illustrated by way of example in the accompanying drawing, wherein.

Figure 1:
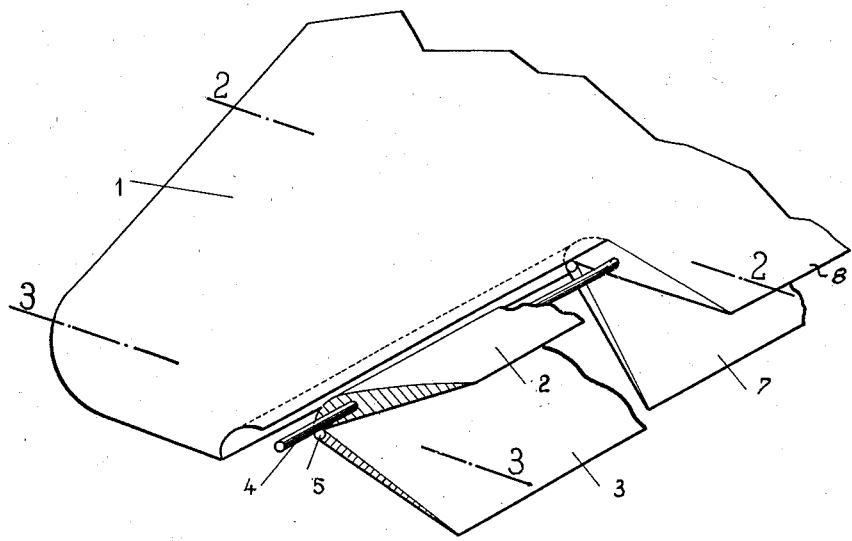
Figure 1 is a perspective view, partly broken away, of an aircraft wing, looking from underneath, comprising a combined flap, wherein the hinging of the lower flap is attached to the front beak of the upper flap, the flaps being in the open position.
Figure 2:
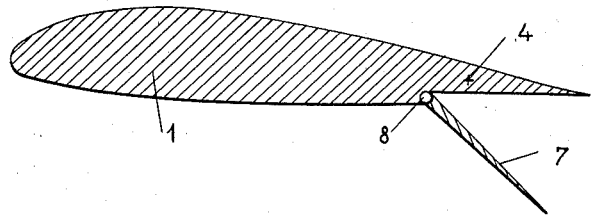
Fig. 2 is a sectional view taken on line 2—2 of Fig. 1.

On the aircraft wing 1, at its rear part, is mounted a combined flap consisting of an upper flap 2 and a lower flap 3. The flap 2 is hinged on an axis 4 secured to the wing and may move about this axis in a suitable manner. The flap 2 is provided at the front with a beak 6. This beak, in the closed position, is hidden in the profile of the wing.

When operating the flap 2 (Figs. 1 and 3) the beak 6 projects beyond the profile of the wing and creates a yawing couple favourable to the turning of the aircraft. The flap 3 is hinged on an axis 5 secured to the flap 2. It is actuated by a control which imparts thereto, with respect to the flap 2, a relative movement independent of the direction of the said upper flap.

The combined flap according to my invention may be used in combination with simple split flaps as shown in Fig. 1. In this figure the combined flap 2, 3 extends along the part of the span suitable for the operation of the aircraft (lateral control or wing cambering). Along the whole or a portion of the remainder of the span there is provided a simple split flap seven movable relatively to the trailing edge 8 of the wing.

With the combined flap it will be seen that the angle between the flap 3 and the flap 2 may be maintained equal or nearly equal to that of the flap 7 with the trailing edge 8 of the wing irrespective of the deflection of the flap 2. There are thus obtained the effects of a split flap which extends over the entire span, and also the aerodynamic advantages of the wing previously described.

Figure 3:
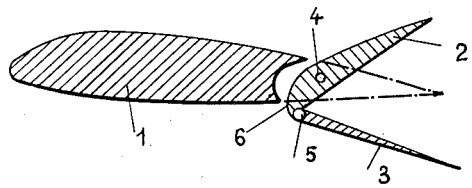
Fig. 3 is a sectional view taken on line 3—3 of Fig. 1.

In the case of Figs. 1 and 3, the hinge 5 is placed at the front part of the beak 6 of the flap 2. The hinge 4 is preferably located at the centre of aerodynamic thrust on the aileron 2 or in the vicinity thereof, slightly in front.

The flaps are intended to be actuated by mechanism such as described in the copending application of Girard, Serial No. 123,288, filed January 30, 1937.

What I claim is:

1. In an airplane wing, ailerons positioned at the lateral extremities thereof, each aileron comprising two superposed elements capable of turning independently of each other, the first element consisting of an upper flap pivoted behind the front edge of the flap, and the second element being a lower flap pivoted on the leading edge of the upper flap.

2. In an airplane wing, the combination with flaps on the central portion of the trailing edge of ailerons positioned at the lateral extremities thereof, each aileron comprising two superposed elements capable of turning independently of each other, the first element consisting of an upper flap pivoted behind the front edge of the flap, the second element being a lower flap pivoted on the leading edge of the upper flap.

HENRI RIVIERE.